Figure 1:
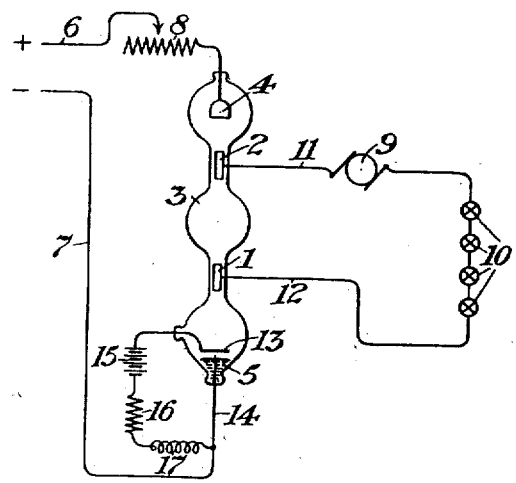

P. C. HEWITT.
CONSTANT CURRENT DISTRIBUTION SYSTEM.
APPLICATION FILED SEPT. 12, 1916.

1,393,019. Patented Oct. 11, 1921.

WITNESS
Chas. F. Clagett

INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY.

CONSTANT-CURRENT DISTRIBUTION SYSTEM.

1,393,019.   Specification of Letters Patent.   Patented Oct. 11, 1921.

Application filed September 12, 1916. Serial No. 119,746.

*To all whom it may concern:*

Be it known that I, PETER COOPER HEWITT, a citizen of the United States, and resident of Ringwood Manor, county of Passaic, State of New Jersey, have invented certain new and useful Improvements in Constant-Current Distribution Systems, of which the following is a specification.

This invention has for its object the utilization of the reactions in a gas, vapor or vacuum device and particularly the reactions at the negative electrode, for obtaining constant current in a circuit having variable electrical characteristics, and also for limiting current flow in a circuit to a definite high limit having variable voltage.

In a vacuum, gas or vapor device an electrode acting as a negative carrying current, presents two distinct states, a primary or leakage state and a secondary or broken-down state. In the first named, or leakage state, the current passes to the surface of the electrode in substantially uniform quantity over the whole surface acting, and, if capable of being seen, glows uniformly over the surface. In this state the electrode is capable of passing current, the current increasing with increased voltage, until a certain value of current is reached, after which the current remains practically constant with increase of voltage even though the increase in voltage be great. This value of current may be called the saturation current of the electrode.

An electrode acting as a negative will act as such cold and pass current in the first named or leakage state when sufficient voltage is applied. When heated to incandescence it will act and receive current at a much lower value of electromotive-force, and the higher the temperature of an electrode the more current it will pass at saturation. The current passed in the saturation state is directly proportional to the surface area acting. A cold electrode acting as a negative will pass current at this lower voltage if exposed in a gas or vapor, vacuum or space carrying current, and the value of the saturation current passed by the electrode will, in a way, be proportional to the current density in the medium to which or in which its surface is exposed, and will also be proportional to the area exposed.

In the second named state or broken-down state, the current enters the surface of the electrode at a spot and there is seen a flame directly over the spot surrounded by a dark space; this spot has a tendency to wander over the surface of the electrode. In this state a negative is capable of passing unlimited current, the limit being the physical endurance of the electrode. If the leakage state be subjected to chemical change or sufficiently high voltage shock with sufficient current backing in the circuit, it will change from the first named state to the second state; therefore, to preserve the first named state, these effects should be limited and avoided, particularly any chemical change at or on the surface acting as or forming part of the negative electrode. Voltage shocks of sufficient force are not liable to occur in ordinary circuits to affect the change in service conditions.

The magnitude of the saturation current of an electrode acting as a negative depends on its surface area, the current density in the medium in which its surface is exposed and its temperature above a certain critical temperature which is somewhere about that of incandescence; therefore, any value of saturation current may be obtained by correlating these factors, and any or all may be used as desired. This applies to very small as well as very large current values. For any value of saturation current, an electrode is serviceable to pass any lower value of current and prevent greater current flow in a circuit.

The characteristics and surroundings of a negative electrode do not prevent its acting as a positive electrode on reversal of current, and when acting as a positive it will obey the laws governing positive electrodes.

An electrode as herein described, with characteristics established so as to act as a negative, when acting positioned so as to act as a positive, will act as such and, under the same conditions of the electromotive-force, usually be capable of carrying more current than when positioned as a negative.

The saturation current may be varied by varying the current density in which its surface is exposed.

Figure 2:
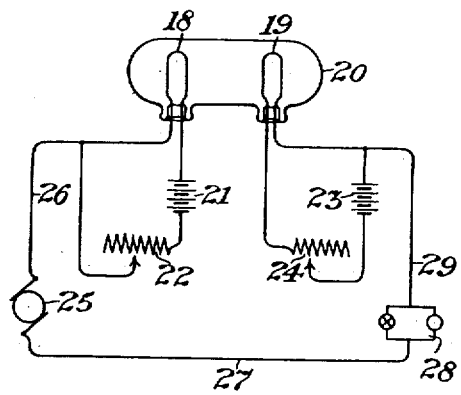
Figure 3:
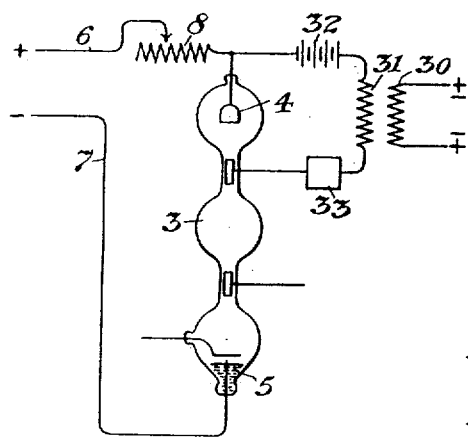
Figure 4:
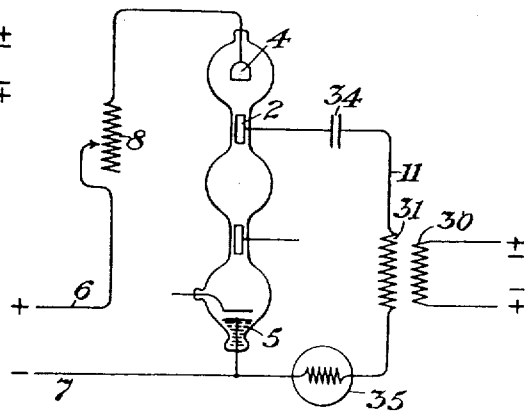

My invention is illustrated in the accompanying drawings in which Figures 1 and 2 are diagrams of electric systems, either alternating or direct, to which my invention is applied, and Figs. 3 and 4 show an arrangement for limiting the flow of current in one direction in an alternating current circuit.

Referring to Fig. 1, 1 and 2 are electrodes, of iron, platinum, aluminum, or tungsten, or of any suitable conducting material, and of definite size, exposed in a vacuum, gas or vapor apparatus 3, and each electrode having its surface present in a medium in which there is a sufficient current density to obtain a definite saturation current when included in a circuit to act as a negative. In this instance, the device 3 is a vacuum electric device, of the mercury negative type, having a positive electrode 4, of iron, at one end, and a negative electrode 5, of mercury, at the other end thereof, suitable mains, 6 and 7, from a direct current supply, being connected respectively, with the positive and negative electrodes 4 and 5 of the device 3. An impedance device, 8, such as an adjustable inductance, or resistance, is included in the positive main for current control purposes.

The electrode 1 is the negative electrode of a circuit made up of a source of variable voltage direct current, 9, here shown as a generator, load 10 of series arc lights and the positive electrode, 2, also located in the vacuum, gas or vapor.

The electrodes 1 and 2 are suspended in the medium carrying current by suitable lead-wires, 11 and 12, sealed through the walls of the vacuum electric device, 3.

In this embodiment of my invention, the "medium carrying current" is the conducting path between the positive electrode 4 and the negative electrode 5, of the vacuum device, 3. The negative electrode 5 is maintained in a continuously broken-down state by the use of a keep-alive circuit consisting of a supplemental positive electrode, 13, connected to the lead 14 of the negative electrode 5, through a battery, 15, a resistance, 16, and an inductance, 17.

The operation of the system shown in Fig. 1 is as follows:

The device 3 can be started into operation by any one of the well-known methods of starting such devices, and in this particular instance it may be shaken or tilted until the material of the electrode 5 makes and breaks a connection with the supplemental positive electrode 13, whereupon current will flow continuously from the battery 15 through the electrodes 13 and 5, thus maintaining the negative electrode 5 in a broken-down condition, after which current can be caused to flow in circuit 6, 4, 5, 7, and can be started by an impulse of high potential, as described, if the electromotive force is not sufficient to start current flow. When the vacuum tube 3 has been started into operation, current from the positive electrode 4 begins to flow to the negative electrode 5, and the conducting path or "medium carrying current" in which the positive and negative electrodes 1 and 2 are exposed, is created.

Thereupon current from the generator 9 to the load 10 begins to flow by way of the positive electrode 2, the "medium carrying current", and the electrode 1; the magnitude of the current passed through the load 10 being dependent upon the current density of the "medium carrying current", and the surface area of the negative electrode 1 which is exposed therein. While I have indicated diagrammatically at 8 an impedance, such as an adjustable resistance, for controlling the current density in the device 3 in which the positive and negative electrodes, 2 and 1, are exposed, it is to be understood that the current density may be controlled by any means and by means, such, for instance, as are described in various patents and applications of mine, particular reference being had to patents issued to me on the 17th day of September, 1901, numbered 682,690 to 682,699, inclusive.

While I have used the electrode 1, for descriptive purposes, as the negative electrode, it will be understood that the electrode 2 may be used as the negative and the electrode 1 as the positive, without departing from my invention.

If, the electrodes 1 and 2 are connected to a source of alternating current, then these electrodes will act alternately as anodes and cathodes, and when acting as cathodes will function as current limiters in the circuit.

In Fig. 2 the electrodes 18 and 19 are shown in the form of filaments, of tungsten, or other suitable material, sealed into a vacuum tube, 20. A battery, 21, supplies current to the electrode 18 and when necessary through a current controlling device, 22. The electrode 19, likewise, is supplied with current from a battery, 23, through the current controlling device, 24, when the filament does not act as sufficient control. The source 25 of variable voltage direct current is connected to the electrode 18 by a wire, 26, and the work circuit is completed through the electrode 19, wire 27, load 28, in this instance, consisting of devices connected in parallel, and wire 29. The device is useful with other sources of variable voltage and any source of variation may be used in connection with the device.

In the operation of the device shown in this figure it will be understood that the amount of current passed through the work circuit from the source of direct current 25 will be controlled by the surface area of the electrode acting as a cathode in the device, the temperature above a certain critical temperature of the said cathode and the material of which it is constituted and the density of gas or vapor within the device.

Of these factors, the surface area, and the material of the electrode are fixed in the manufacture of the device and the temperature of the filament acting as a cathode will be determined by the amount of current flowing in it.

When utilizing this device in connection with an alternating current source, it is necessary, if current is to flow in both directions, to have both electrodes heated to a temperature at which they will act as cathodes in the required degree. For direct current it is sufficient to heat only the electrode acting as a cathode. In the case where an unsymmetrical current is desired from an alternating current source, one of the electrodes, 18 or 19, may be brought to a different temperature from the other, in which case more current will flow through the device in one way than in the other, the limit of difference being where one electrode is below the critical temperature and the other heated to the temperature at which it will function as a cathode in the greatest degree.

In Fig. 3, 30 is a source of alternating current, 31 is the secondary of a transformer supplied with current from 30. In the lead from the secondary 31 to the anode 4 is a battery, 32, the object of which is to prevent direct current flow in the circuit 4, 2, 32, the load, 33, and transformer secondary 31, which current flow would originate from the drop in potential across electrodes 4 and 2, due to the current from the source 6—7.

This is an asymmetric arrangement for obtaining current preponderating in one direction through the load 33. With the arrangement of parts as shown in this figure, the electrode 2, when acting as a positive electrode, will pass any amount of current, not greater than the current in the circuit 6—7 plus the saturation current of the electrode 4 acting as a cathode. With a reversal of current, however, and with the electrode 2 acting as a negative, it will permit the passage of only a limited amount, as determined by the predetermined factors, as already explained.

In Fig. 4, 30 is the primary and 31 is the secondary of a transformer supplying alternating current through the circuit containing condenser 34, electrode 2, device 3, electrode 5, and load 35. Electrode 2 when acting as an anode would pass any amount of current within limits, whereas on the reversal of the alternating current, when electrode 2 is called upon to act as a cathode, the current it will pass is limited and determined, as previously described, but since in the lead to electrode 2 a condenser is inserted, and since the current flow into and out of a condenser must be equal, there will flow in the circuit 2, 5, 35, 31 and 34, the same current in both directions and this current will be limited by the cathode saturation current of electrode 2.

The keep-alive circuits shown in the figures may be dispensed with when there is sufficient current flowing from other circuits into the negative electrode to keep it in active condition.

To obtain certain results, it is not essential that the electrode to be used as a saturated cathode be located in the path between the main electrodes, and it may be located anywhere within the container, as desired.

While the electrodes 1 and 2 in the drawing are shown in the form of tubes, it is to be understood that these electrodes may take the form of plates, grids, or screens, or be of any suitable shape or material, for instance of aluminum, or tungsten.

In certain cases it is desirable to control the temperature of the vacuum, gas, or vapor device in part or wholly. This may be done by projecting a fluid of the proper temperature against the parts, the temperature of which is to be controlled. This may also be accomplished by means of a jacket applied to the device where desired, and this jacket may be of insulating material or adapted to have circulated through it a refrigerating or heating medium.

I claim as my invention:

1. In a system of electrical distribution, the method of controlling the current emissive capacity of an electrode which consists in subjecting said electrode to the influence of a medium carrying current, and maintaining said medium at a predetermined current density.

2. In a system of electrical distribution, the method of controlling the current emissive capacity of an electrode, which consists in exposing said electrode in a medium carrying current, and maintaining said medium at a predetermined current density.

3. The method of obtaining constant current in an electrode, which consists in impressing current on said electrode and limiting the current emissive capacity of said electrode by subjecting it to the influence of a medium carrying current.

4. In a vacuum, gas, or vapor device, electrodes independent of the main electrodes thereof, and means for limiting the current emissive capacity of one of said independent electrodes to control the flow of current in the circuit of the independent electrodes.

5. In a vacuum, gas, or vapor device, electrodes independent of the main electrodes thereof, and means for limiting the current emissive capacity of one of said independent electrodes to control the flow of current therethrough.

6. The combination of an exhausted container, the electrodes 4 and 5 therein, and the electrode 2 interposed in the path between the electrodes 4 and 5, the electrode 2 having a limited current emissive capacity.

7. In a system of electrical distribution, the method of controlling the current emissive capacity of an electrode, which consists in subjecting said electrode to the influence of a medium carrying current and controlling the current density in the medium.

8. In a system of electrical distribution, the method of controlling the current emissive capacity of an electrode, which consists in subjecting said electrode to the influence of a medium carrying current, and varying the current in the medium to vary the current emissive capacity of the said electrode.

9. The method of obtaining constant current in an electrode, which consists in limiting the current emissive capacity of said electrode by subjecting said electrode to the influence of a current carrying medium and controlling the current in the medium.

10. The combination of an electric device, having a positive and a negative electrode, means for causing a current flow therethrough, an electrode in the path of the current flow and means for constituting it a cathode for a second circuit, said cathode having a limited current emissive capacity.

Signed at New York, in the county of New York, and State of New York, this 7th day of September, A. D. 1916.

PETER COOPER HEWITT.

Witnesses:
R. G. HEWITT,
WALTER E. F. BRADLEY.